United States Patent
Kubichan

(10) Patent No.: US 6,171,524 B1
(45) Date of Patent: Jan. 9, 2001

(54) THERMOCHROMIC COATING FOR OUTDOOR USE AND METHOD OF APPLYING

(76) Inventor: Antony J. Kubichan, 19481 Rosita St., Tarzana, CA (US) 91356

( * ) Notice: Under 35 U.S.C. 154(b), the term of this patent shall be extended for 0 days.

(21) Appl. No.: 09/158,192

(22) Filed: Sep. 21, 1998

Related U.S. Application Data

(60) Provisional application No. 60/059,593, filed on Sep. 23, 1997.

(51) Int. Cl.$^7$ .............. G02F 1/00; B23B 15/04; B23B 27/30
(52) U.S. Cl. .......... 252/583; 428/457; 428/522; 428/913; 428/1
(58) Field of Search .............. 252/583, 299.01; 428/457, 522, 913, 1

(56) References Cited

U.S. PATENT DOCUMENTS

| | | | |
|---|---|---|---|
| 4,028,118 | * | 6/1977 | Nakasuji .............. 428/913 |
| 4,421,560 | * | 12/1983 | Kito et al. .............. 252/583 |
| 4,425,161 | * | 1/1984 | Shibahashi et al. .......... 252/583 |
| 5,058,999 | * | 10/1991 | Davis .................... 359/53 |
| 5,124,819 | * | 6/1992 | Davis .................... 359/53 |
| 5,490,956 | * | 2/1996 | Kito et al. .............. 252/583 |
| 5,573,848 | * | 11/1996 | Van Praet ................ 428/913 |
| 5,585,425 | * | 12/1996 | Kito et al. .............. 428/522 |
| 5,721,059 | * | 2/1998 | Kito et al. .............. 428/522 |
| 5,918,981 | * | 7/1999 | Ribi .................... 252/583 |

OTHER PUBLICATIONS

Chemical Abstracts 93: 159126, Abstract of Sheng Wu Hua Hsueh Yu Sheng Wu Wu Li Chin Chan, vol. 30 pp. 64–67, (1979).*

* cited by examiner

Primary Examiner—Philip Tucker
(74) Attorney, Agent, or Firm—Robert M. Sperry

(57) ABSTRACT

An improved protective coating for thermochromic materials comprising a sheet of thermochromic material bonded to a substrate and coated with a layer of protective liquid which hardens to protect and bond with the thermochromic material and substrate against erosion by atmospheric conditions or abrasion, together with a method for forming such a coating.

4 Claims, 2 Drawing Sheets

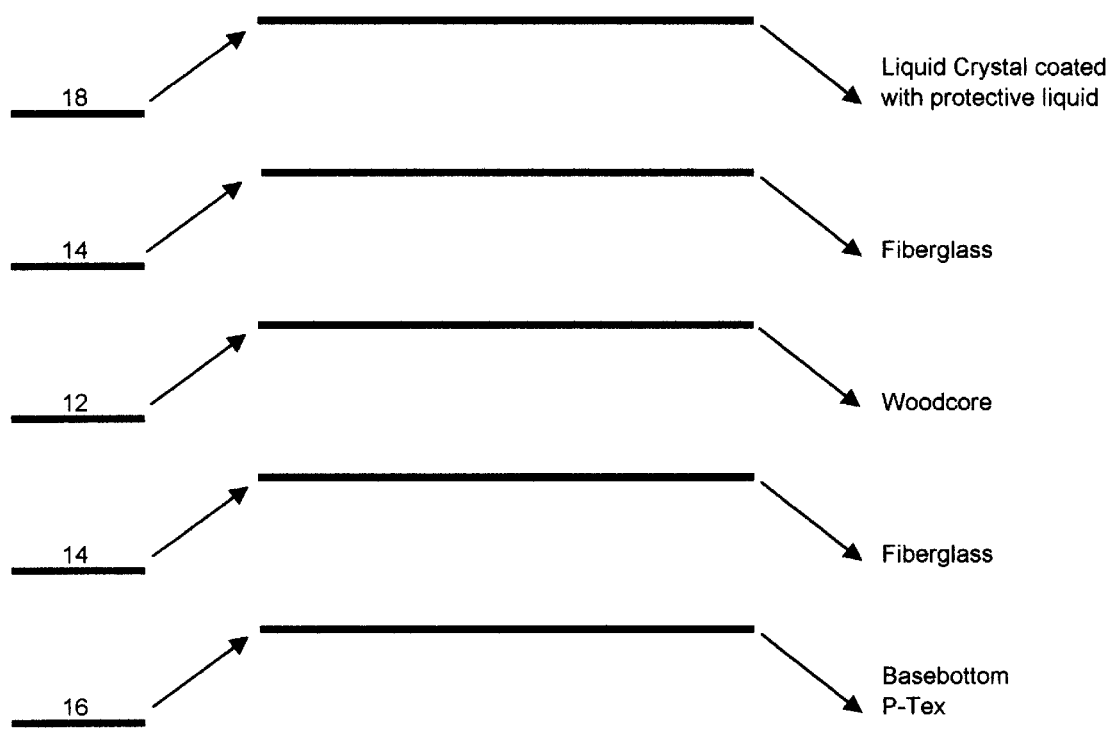

THERMOCHROMIC COATING FOR OUTDOOR USE AND METHOD OF APPLYING

RELATED CASES

This invention is described in my copending Provisional patent application Ser. No. 60/059,593, filed Sep. 23, 1997.

FIELD OF INVENTION

This invention relates to thermochromic materials and is particularly directed to improved thermochromic liquid crystal coatings for use in outdoor and abrasive atmospheres, together with suitable methods for applying such coatings.

PRIOR ART

Thermochromic materials, such as liquid crystals, have been known for many years. However, the use of such materials has been limited to so-called "mood rings", greeting cards and the like, due to the fact that the prior art thermochromic materials have been jellylike in substance and were not able to withstand exposure to outdoor conditions. Also, they were easily rubbed off by something brushing against it. Heretofore, thermochromic materials have been provided in sheet form on a supporting layer of transparent material, such as mylar, to prevent the sheet of thermochromic material from tearing or becoming otherwise damaged. Also, once applied to a substrate, the mylar served to protect the thermochromic sheet. However, it has been difficult to make the mylar adhere to the thermochromic material and the mylar layer has not provided satisfactory protection against erosion by atmospheric conditions or damage by abrasion or the like. Other attempts have been made heretofore to provide protective coatings for the thermochromic materials. However, many of the prior art protective coatings have had adverse chemical effects on the thermochromic material and have prevented the thermochromic materials from functioning properly. Mylar and other protective coatings have been unable to withstand exposure to atmospheric conditions and have peeled or otherwise become delaminated from the substrate. Thus, none of the prior art protective coatings or thermochromic materials have been entirely satisfactory.

BRIEF SUMMARY AND OBJECTS OF INVENTION

These disadvantages of the prior art are overcome with the present invention and improved protective coatings are provided which are simple and inexpensive to produce and apply and which combine with the thermochromic material to provide temperature-sensitive surfaces which are able to withstand exposure to even severe atmospheric conditions and which strongly resists abrasion, rubbing and other harsh treatment.

These advantages of the present invention are preferably attained by providing an improved protective coating for thermochromic materials comprising a sheet of thermochromic material bonded to a substrate and coated with a layer of protective liquid which hardens to protect and bond with the thermochromic material and substrate against erosion by atmospheric conditions or abrasion, together with a method for forming such a coating.

Accordingly, it is an object of the present invention to provide an improved thermochromic coating.

Another object of the present invention to provide an improved thermochromic coating which is not subject to damage by atmospheric conditions or abrasion.

An additional object of the present invention is to provide improved thermochromic coatings which are simple and inexpensive to produce and apply.

A further object of the present invention is to provide improved thermochromic coatings which combine with the thermochromic material to provide temperature-sensitive surfaces which are able to withstand exposure to even severe atmospheric conditions.

Another object of the present invention is to provide improved thermochromic coatings which strongly resist abrasion, rubbing and other harsh treatment.

An additional object of the present invention is to provide improved thermochromic articles which can withstand exposure to atmospheric conditions and abrasion.

A further object of the present invention is to provide improved methods of applying thermochromic coatings.

A specific object of the present invention is to provide an improved protective coating for thermochromic materials comprising a sheet of thermochromic material bonded to a substrate and coated with a layer of protective liquid which hardens to protect and bond with the thermochromic material and substrate against erosion by atmospheric conditions or abrasion, together with a method for forming such a coating.

These and other objects and features of the present invention will be apparent from the following detailed description, taken with reference to the figures of the accompanying drawing.

BRIEF DESCRIPTION OF THE DRAWING

FIG. 2 is an exploded view showing a typical structure for a sports board.

DETAILED DESCRIPTION OF THE INVENTION

Figure 1:
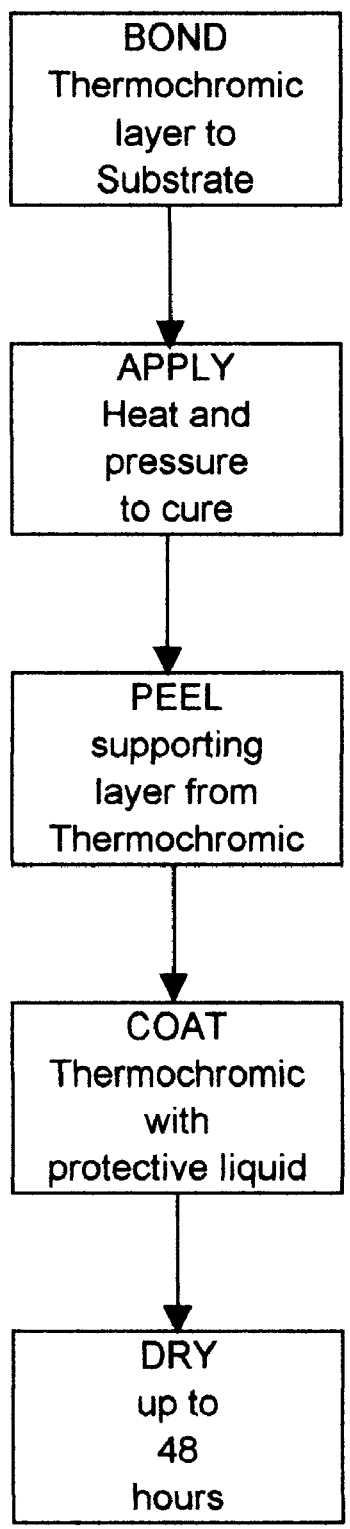
FIG. 1 is a flow diagram showing the steps of the method of the present invention for applying thermochromic coatings.

In that form of the present invention chosen for purposes of illustration, FIG. 1 is a flow diagram showing the steps of the method of the present invention for applying the improved thermochromic coatings of the present invention. Thermochromic materials, such as liquid crystals, are gelatin-like materials which are easily torn and are highly subject to damage by abrasion. Accordingly, layers of thermochromic material are conventionally supplied on a supporting layer of stronger material, such as mylar. However, the supporting layers of the prior art do not stand up well against exposure to atmospheric conditions or to strongly abrasive actions. Thus, in accordance with the method of the present invention, the layer of thermochromic material is bonded to a desired substrate by means of a suitable adhesive, such as a resin adhesive. Thereafter, the substrate bearing the thermochromic layer is heated to approximately 100°–1000° F. at a pressure of up to 1000 psi. for a period of up to 2 hours to cure the adhesive. Next, the supporting layer is peeled off of the thermochromic layer and the article is coated with a protective liquid, such as an acrylic material, and is allowed to air dry for up to 48 hours. When dry, it is found that the protective liquid bonds to the substrate and to the thermochromic layer to form a strong coating which can withstand substantial exposure to even extreme atmospheric conditions and can resist significant abrasive action. Furthermore, it is found that the thermochromic material will change colors at temperatures approximately 100°–20° lower that before undergoing this treatment, which makes the thermochromic material more suitable for outdoor uses.

Preferably, the thermochromic layer is bonded to the substrate with a suitable resin adhesive and is cured at a temperature of about 350° F. at a pressure of approximately 45 psi for a period of one-half hour. Thereafter, the supporting layer is peeled off of the thermochromic layer and the substrate and thermochromic layer are coated, as by spraying, with a protective liquid comprising 0–6 parts of a transparent protective liquid, such as acrylic, together with 0–5 parts of a suitable catalyst, such as polyisocyanate and 0–5 parts of a suitable solvent reducer. A preferred formulation for the protective liquid is 4 parts DCU2021 acrylic with 1 part DU5 catalyst and 1 part DT870 or 885 reducer. The DCU2021, DU5 and DT870 or 885 are available from PPG Industries, 19699 Progress Drive, Strongville, Ohio 44136. Thereafter, the article is allowed to air dry for up to 48 hours, during which the protective liquid bonds with the thermochromic layer and substrate to form an extremely hard and weather -resistant protective layer.

In use, the method of the present invention has been found to be useful in manufacturing sports boards, such as snow boards, skis, skate boards, surf boards, body boards and the like, as seen at 10 in FIG. 2. These sports boards 10 are usually formed as laminated structures, having a wood core 12 sandwiched between layers 14 of fiberglass. Because the fiberglass layers 14 are porous, they are usually covered by an outer layer 16 formed of a strong transparent material, such as P-Tex 1500, available from Snow-Tek USA, Inc., Traditionally, the protective outer layer 16 is applied to both the top and bottom surfaces of the sports board 10. However, in accordance with the present invention, the outer layer 16 is omitted or removed from the top surface and is replaced with the thermochromic layer 18, which is formed by the method described above and is applied directly to the fiberglass layer 14. When this is done, the thermochromic layer 18 is found to be at least as abrasion-resistant and weather-resistant as the protective outer layer 16 and will change colors in response to temperatures in the range of 10°–20° F. lower than prior to application by the method of the present invention. Also, it has been found that the thermochromic layer 18 can be applied equally well to non-porous substrates, such as metal, using the method described above.

Obviously, numerous variations and modifications can be made without departing from the spirit of the present invention. Accordingly, it should be clearly understood that the forms of the present invention described above and shown in the figures of the accompanying drawing are illustrative only and are not intended to limit the scope of the present invention.

What is claimed is:

1. An article of manufacture comprising:

a substrate, a film of thermochromic liquid crystal material bonded to said substrate, said film and substrate being cured at a temperature of approximately 100°–1000° F. at a pressure of up to about 200 psi for up to two hours, after which any supporting layer for said thermochromic film is peeled off, and a layer of protective liquid coating said film and substrate which hardens to protect said film and substrate against erosion by atmospheric conditions or abrasion.

2. The article of claim 1 wherein:

said film is bonded to said substrate with a resin adhesive.

3. The article of claim 1 wherein:

said substrate is porous.

4. The article of claim 1 wherein:

said substrate is fiberglass.

\* \* \* \* \*